United States Patent [19]
Satake

[11] 3,947,967
[45] Apr. 6, 1976

[54] ROOT CANAL MODEL FOR USE IN PRACTICAL DENTAL ART TRAINING

[76] Inventor: Yoshimasa Satake, 61, Karahashi-Hiragakicho, Minami, Kyoto, Japan

[22] Filed: Dec. 5, 1974

[21] Appl. No.: 529,741

[52] U.S. Cl. .................................................. 32/71
[51] Int. Cl.² ........................................ G09B 23/28
[58] Field of Search ....................................... 32/71

[56] References Cited
UNITED STATES PATENTS

| 1,967,786 | 8/1934 | Schulz | 32/71 |
| 2,750,670 | 6/1956 | Vigg | 32/71 |

*Primary Examiner*—Robert Peshock

[57] ABSTRACT

A root canal model for use in practical dental art training comprises a transparent plastic body provided therein with an imitation dental pulp.

10 Claims, 8 Drawing Figures

ROOT CANAL MODEL FOR USE IN PRACTICAL DENTAL ART TRAINING

The present invention relates to a root canal model, especially for use in dental art study or in practical training therefor.

Many kinds of artificial teeth have been heretofore used in studying dental art and practical training for dental students at a dental expert training school or the like. Most of these artificial teeth, however, resemble natural teeth only in appearance and are not provided with an internal structure corresponding to a natural dental pulp and nerves thereof, so that they cannot help dental students to practise dental treatment operations.

In the inventors's registered Japanese Utility Model (Utility Model Publication No. 6636/1966), disclosed is an artificial tooth for practical training which resembles natural tooth in appearance and is provided with an internal structure corresponding to a dental pulp and nerves thereof and further formed partially transparent thus affording to be used in practical training of dental treatment operation, so that said artificial tooth has overcome the disadvantages of many kinds of the conventional art ificial teeth to some extent.

However, the abovementioned artificial tooth has proved not perfectly suitable for use in training of dental treatment operation in the respect that its appearance similar to natural tooth results in making its side surface curved, thus giving distorted visions of a dental pulp and nerve structure thereof owing to an optical lens effect.

The principal treatment process in dental art is a series of operations comprising (1) dental pulp extraction, or extracting a dental pulp from a tooth lost portion, (2) pulp cavity enlargement, or boring and cutting at a tubule-shaped cavity formed within a tooth body after dental pulp extraction and (3) root canal filling or supplementally filling the cut and enlarged pulp cavity with medicine and others. The practical training for becoming skilled in those operations is very important in the curriculum for dental students and others. However, as abovementioned, many kinds of conventional articifial teeth or imitation teeth are not provided with complicated and minute dental pulp and nerve fiber structure thereof at all, or if provided therewith, they cannot be apparently observed from outside or the molding material thereof is not selected suitable for cutting operation and so forth, so that they are not suitable samples for dental art study and practical training therefor, namely, for studying depth or width of cut in cutting, enlarging and prosthetic operations of a tooth lost portion.

Therefore, the object of the present invention is to provide a new sample, or a root canal model for use in dental art study and practical training therefor.

An embodiment of a root canal model according to the present invention will be described with reference to the appended drawings, in which.

Figure 1:
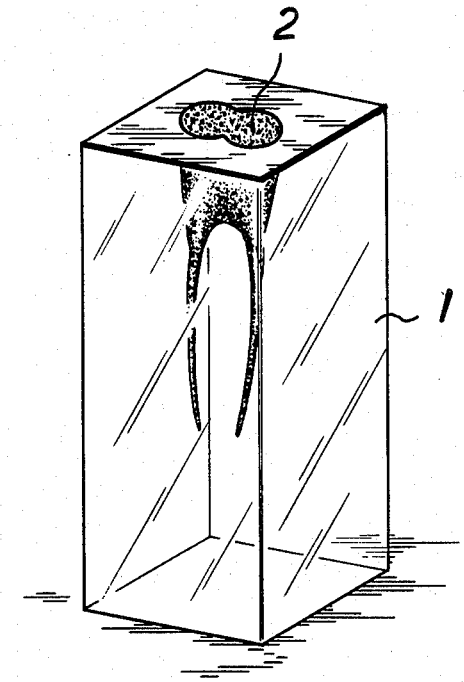
FIG. 1 is a perspective view of a typical embodiment of a root canal model according to the present invention, which is provided thereinside with an imitation dental pulp.

Referring to FIG. 1, shown is an embodiment of a root canal model according to the present invention comprising a tooth body portion 1 corresponding to a natural tooth body and an imitation dental pulp 2 corresponding to a natural dental pulp. Coloring, for example, red-coloring of the imitation dental pulp can facilitate observation thereof from outside.

Figure 2:
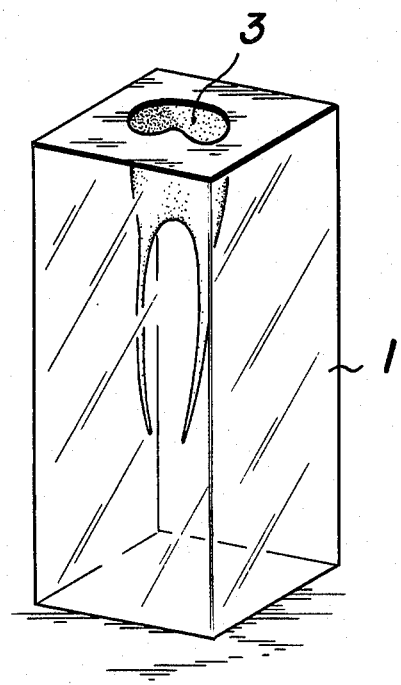
FIG. 2 is a perspective view of another typical embodiment of a root canal model according to the present invention, wherein an imitation dental pulp has been extracted.

Referring to FIG. 2, shown is a modified embodiment of a root canal model of FIG. 1 having a tubule-shaped cavity 3 corresponding to that of a natural tooth after dental pulp extraction.

Figure 3:
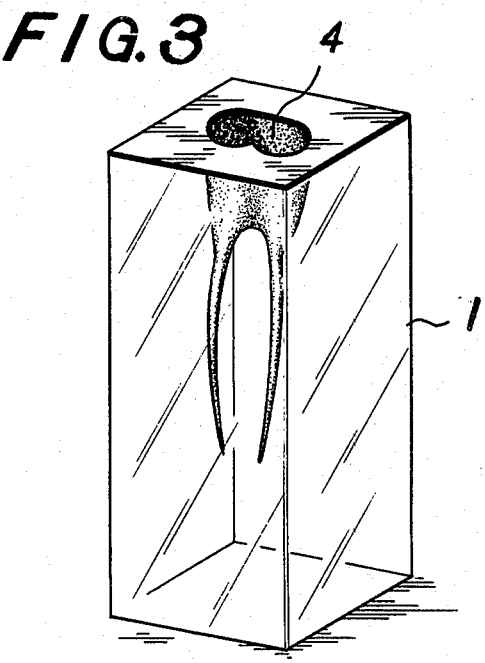
FIG. 3 is a perspective view of a further typical embodiment of a root canal model according to the present invention, wherein inner surface of a pulp cavity is colored after dental pulp extraction operation.

Referring now to FIG. 3, shown is another modified embodiment of a root canal model of FIG. 1 with a tubule-shaped cavity 4 with the inner surface colored e.g. with red dye. Said root canal model, similarly to that of the first modification, corresponds to a natural tooth after dental pulp extraction, but in this case the tubule-shaped cavity 4 can be easily identified from outside due to coloration thereof.

Figure 4A:
FIGS. 4a–4c are perspective views of an imitation dental pulp respectively.
Figure 4B:
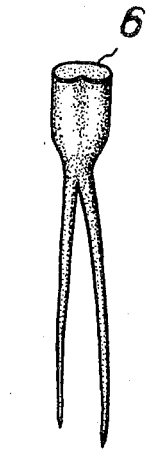
Figure 4C:

Referring now to FIG. 4, shown are some embodiments of imitation dental pulps 5, 6 and 7 for a root canal model according to the present invention. However, the present invention is not limited to these embodiments, of course, but an imitation dental pulp provided e.g. with a capillary-like nerve structure can be applied. Usually the root canal model is formed into a square-pillar-shape so that the internal structure thereof can be correctly and clearly observed from various sides, while the size of the whole body of the model can be varied as desired.

The material for forming the tooth body portion of a root canal model according to the present invention is transparent synthetic resin, or resinous material of Brinell hardness about 20 if easy cutting is desired, or preferably resinous material capable of being cast for the purpose of easy production. The preferred materials are, for example, epoxy resin, unsaturated polyester resin, acrylic acid resin, urea resin and the like. The material for forming the imitation dental pulp as shown in FIG. 4 is flexible plastic material such as silicone rubber, polyethylene, or soft epoxy resin. Usually, the material is appropriately colored with an organic or inorganic pigment such as chromophthal red, cadmium red or the like for the purpose of clear visual distinction from the transparent tooth body portion, and further it may be mixed with fibrous material such as asbestos, synthetic fiber, natural fiber or the like for obtaining a desired strength.

For use in practical training of dental pulp extraction operation, the imitation dental pulp embedded in the root canal model according to the present invention is not to be in an extremely strong connection with the tooth body portion of the model. And the surface of the imitation dental pulp may be coated with a suitable releasing agent if desired. Further, the imitation dental pulp may comprise a processed natural dental pulp, which is made of a natural dental pulp in the conventional manner.

The processed natural dental pulp comprises, for example, a dental pulp the surface of which is cured with synthetic resin, a perfectly dehydrated and dried natural dental pulp, a dental pulp which is dehydrated and then impregnatedly cured with synthetic resin, a dental-pulp-shaped cured resin article formed by injecting resin into a pulp cavity, curing the same and then melting the natural organization away therefrom, or the like.

For a root canal model without any imitation dental pulp but with a colored imitation pulp cavity as shown in FIG. 3, a preferred coloring agent is, for example, a water-soluble dye e.g. Cummerssi Violet, or an oil-soluble dye e.g. oil red used with petroleum benzine as a solvent.

Coloring operation of the pulp cavity with the above-mentioned dye is very simple or comprises only filling the dye in the cavity for a predetermined time, then removing residual dye away and drying the cavity. The color can be selected as desired.

According to the present invention, there can be provided a modified embodiment of the root canal model as shown in FIG. 1, which modification is made by coating the surface of the imitation dental pulp with a releasing agent e.g. silicone oil, then further coating the same with lacquer including oil-soluble dye e.g. oil red, and casting one transparent plastic material selected from unsaturated polyester resin, epoxy resin and acrylic resin into a tooth body portion of the model. The said model is characterized by its advantageous property of providing a colored imitation pulp cavity since the lacquer including oil-soluble dye coated on the imitation dental pulp has a remarkable affinity for the plastic tooth body portion and therefore closely adheres to the latter, thus still leaving itself thereon even after extraction of the imitation dental pulp.

The present invention will become more apparent from the following description of examples of a method for using the root canal model according to the present invention in dental art study and practical training thereof.

a. Practical training of dental pulp extraction operation.

A trainee performs dental pulp extraction operation on an imitation dental pulp provided in a root canal model using dental pulp extraction instruments. In this case, the model according to the present invention enables the trainee to perform the operation with observing the positions of the imitation dental pulp and nerves thereof, thus helping him very much to become skilled in the art especially if he is a beginner. Further, by suitably controlling the tensile strength of the imitation dental pulp, the training can be repeated under the similar condition to that of extraction operation of a natural dental pulp. Further, by using a root canal model provided with an imitation dental pulp not exposing the upper end thereof above the model surface, or slightly exposing thereabove, cutting operation can also be performed on the model.

The root canal models used in this practical training are ones as shown in FIG. 1 and the modification thereof.

b. Practical training of cutting a root canal and enlarging the pulp cavity thereof.

On a root canal model after extraction of an imitation dental pulp therefrom or a model without an imitation dental pulp as shown in FIGS. 2 and 3, a trainee performs operations of cutting a root canal and enlarging the pulp cavity using dental cutting instruments.

The root canal model according to the present invention is optically transparent and comprises a square pillar body with plane surfaces, so that the trainee can perform the operation with observing the correct positions of an imitation dental pulp having a complicated and minute capillary-shaped structure and nerves thereof, thus affording to enjoy a remarkable training effect.

For practical cutting operation on the part corresponding to especially delicate natural nervous fiber, suitable is to use a root canal model provided with an imitation pulp cavity as shown in FIG. 3.

c. Practical training of filling a pulp cavity with medicine and others.

For this operation, used is a root canal model which has been subject to the said operation (b), or a model as shown in FIGS. 2 or 3. In this case, a trainee also can perform the operation with observing the correct positions to be filled with medicine and others, thus affording to remarkably develop his skill.

As apparent from the above, the root canal model according to the present invention is entirely different in structure and function from the conventional artificial tooth made to imitate a natural tooth, and thus contributes much to practical training for dental students and dental experts.

Now the present invention will be described in more detail by way of the following examples thereof.

EXAMPLE 1

This example provides a method for manufacturing a root canal model of epoxy resin material according to the present invention.

1. Preparation of Epoxy Resin Syrup

Epoxy resin syrup was prepared by mixing 100 parts of a condensate of bisphenol A and epichlorohydrin with 10 part of triethylenetetramine (curing agent) and uniformly stirring the same.

2. Casting Mold

Figure 5:
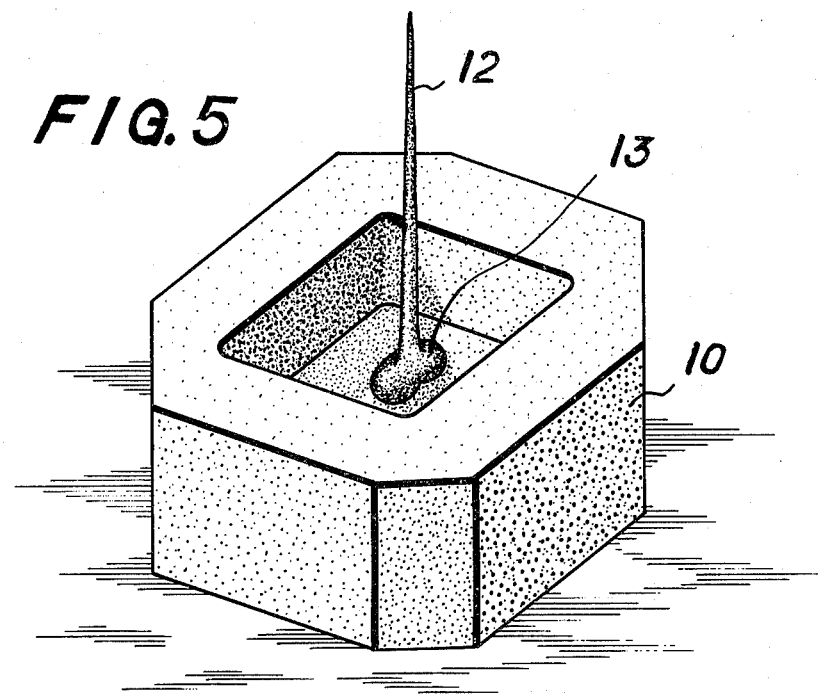
FIGS. 5 and 6 are perspective views each for illustration of a method of producing a root canal model according to the present invention.
Figure 6:
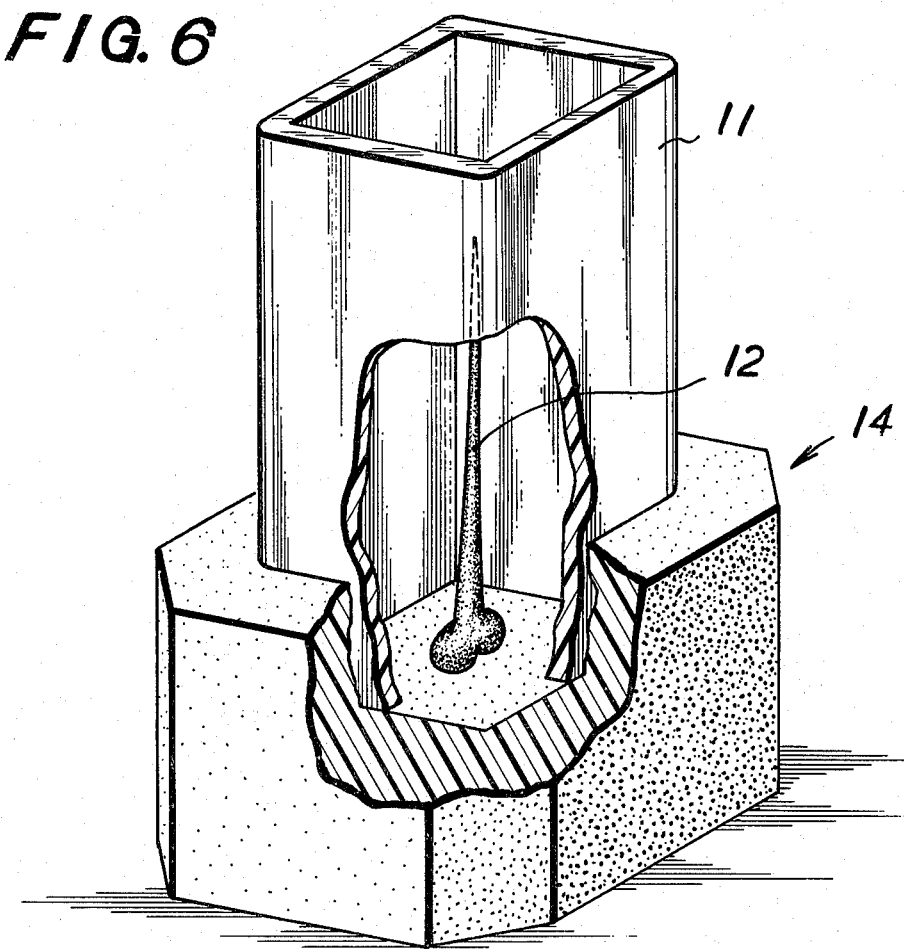

A casting mold used in this example is shown in FIGS. 5 and 6.

The outer part of the mold comprises a base 10 of silicone rubber and a removable and hollowed polygonal-pillar-shaped outer frame 11 of polyethylene, while a core piece 12 constituting an imitation dental pulp is formed of flexible plastic material e.g. silicone rubber, polyethylene or soft epoxy resin, and embeddedly located in a hole 13 provided in the center of the base 10 as shown in FIG. 5. In FIG. 6, shown is a casting mold, wherein the base 10, the outer frame 11 and the core piece 12 have been assembled. A mold of other material and structure than those described in this example such as a metal mold can be also used as a mold according to the present invention by taking appropriate measures therefor e.g. using a releasing agent, of course.

3. Casting

A root canal model can be obtained by injecting epoxy resin syrup into the said casting mold, leaving the same at room temperature about 10 hours to cure the same, and then removing the outer frame and the base and cutting the end surface of the model. The obtained root canal model is provided with an imitation dental pulp as shown in FIG. 1. By removing the imitation dental pulp (core piece) from the model, there can be obtained a model as shown in FIG. 2. And further, by coloring the inner surface of the dental cavity with a desired dye as abovementioned, there can be obtained a model as shown in FIG. 3.

In this example, a processed natural dental pulp may be used for an imitation dental pulp 12.

EXAMPLE 2

Various types of root canal models as shown in FIGS. 1–3 were manufactured by applying the same method and casting mold as used in Example 1, and using unsaturated polyester resin, acrylic resin and urea resin as molding materials. Each of preparations of resin materials and casting conditions in this example will be now described below.

a. Unsaturated Polyester Resin
Preparation of the resin syrup:
100 parts of a condensate of phthalic acid and propylene glycol and an curing agent comprising 1 part of metylethylketon-peroxide and 1 part of cobalt naphthenate were mixed and stirred uniformly.
Casting condition:
Leaving at room temperature for 1–2 hours.

b. Acrylic Acid Resin
Preparation of the resin syrup:
The syrup was obtained by mixing 100 parts of methyl methacrylate and 0.5 part of benzoyl peroxide (curing agent) and continuously stirring the same at a temperature of 80°C about 2 hours for prepolymerization.
Casting condition:
Leaving at 40°C about 8 hours.

c. Urea Resin
Preparation of the resin syrup:
The resin syrup was obtained by adding 100 cc of water, 1,000 cc of hormalin and 50 cc of 5 N aqueous ammonia to 300 g of urea and vacuum-sucking the mixture with keeping pH thereof within a range of 7–8, or heating the mixture at 50°–60°C, thus concentratingly dehydrating till water content thereof became 35 percent.
Casting condtion:
Leaving at 60°–100°C for 1–2 hours.

EXAMPLE 3

This example provides a material for a root canal model provided with an imitation dental pulp according to the present invention, wherein a colored inner surface of the pulp cavity can be formed after extraction of said pulp.
1. Imitation Dental Pulp
All of the abovementioned materials can be used for this imitation pulp.
2. Releasing Agent
Releasing agent e.g. silicone oil can be used for improving releasability of the imitation dental pulp and the dye from each other.
3. Paint A lacquer paint including oil-soluble dye (e.g. oil red).
4. Material for Forming the Tooth Body Portion of the Model
Lipophilic resin e.g. unsaturated polyester resin, epoxy resin, acrylic resin or the like.

The method for manufacturing the root canal model of this example is characterized by selecting the material as abovementioned and by applying the imitation dental pulp the surface of which has been subject to coating treatments with the releasing agent (2) and further with the paint (3), the details of said method being the same as described in Examples 1 and 2.

The root canal model according to this example has a extremely remarkable property of providing a colored inner surface to the pulp cavity after dental pulp extraction.

A variety of kinds of root canal models obtained as abovementioned proved to be extremely preferable samples for practical dental art training.

What is claimed is:

1. A root canal model for use in practical dental art training comprising a transparent plastic body and imitation dental pulp contained within the body, the body having at least one flat viewing surface to permit the pulp to be viewed without distortion.

2. The root canal model of claim 1 in which the body has a generally rectangular cross section provided by four orthogonally related flat side surfaces.

3. The root canal model of claim 1 in which said imitation dental pulp is formed of plastic material.

4. The root canal model of claim 1 wherein said transparent plastic body is formed of material selected from the group consisting of epoxy resin, unsaturated polyester resin, acrylic resin and urea resin.

5. The root canal model of claim 1 in which the imitation dental pulp includes a first coating of releasing agent and a second coating of a lacquer having an oil-soluble dye therein, the releasing agent facilitating removal of the imitation dental pulp from the body, the lacquer adhering to the body after removal of the imitation dental pulp to provide a colored cavity in the body.

6. The root canal model of claim 5 in which said transparent plastic body is formed of lipophilic synthetic resin.

7. The root canal model of claim 5 in which said transparent plastic body is formed of lipophilic synthetic resin selected from the group consisting of epoxy resin, unsaturated polyester resin, and acrylic resin.

8. The root canal model of claim 5 in which said oil-soluble dye is oil red.

9. The root canal model of claim 5 in which said releasing agent is silicone oil.

10. A root canal model for use in practical dental art training comprising a transparent plastic body provided therein with an imitation pulp cavity, the body having four orthogonally related flat side surfaces whereby the pulp cavity can be viewed through the side surfaces without distortion.

* * * * *